(12) United States Patent
Gotoh

(10) Patent No.: US 6,884,948 B2
(45) Date of Patent: Apr. 26, 2005

(54) MULTI-DIRECTIONAL SWITCH

(75) Inventor: Kazunori Gotoh, Unterschleissheim (DE)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 10/897,322

(22) Filed: Jul. 22, 2004

(65) Prior Publication Data
US 2005/0040018 A1 Feb. 24, 2005

(30) Foreign Application Priority Data
Jul. 25, 2003 (JP) .................................. 2003-201788

(51) Int. Cl.$^7$ ................................................ H01H 9/30
(52) U.S. Cl. ...................... 200/6 A; 200/332; 200/335; 338/126; 345/161
(58) Field of Search ................. 200/6 A, 6 R, 200/4, 335, 332, 5 R, 17 R, 18; 338/128, 131, 133; 345/161, 156, 157

(56) References Cited

U.S. PATENT DOCUMENTS

| | | | | |
|---|---|---|---|---|
| 4,237,629 A | * | 12/1980 | Schmidt ...................... 37/234 |
| 4,280,027 A | * | 7/1981 | Comerford et al. ......... 200/6 A |
| 4,769,517 A | * | 9/1988 | Swinney ..................... 200/6 A |
| 5,229,742 A | * | 7/1993 | Miyamoto et al. .......... 338/128 |
| 5,607,049 A | * | 3/1997 | Shioda ........................ 200/557 |
| 5,724,068 A | * | 3/1998 | Sanchez et al. ............. 345/161 |
| 6,078,247 A | * | 6/2000 | Shimomura .................. 338/131 |
| 6,509,535 B1 | * | 1/2003 | Nakamura .................... 200/6 A |
| 6,535,104 B1 | * | 3/2003 | Koizumi ........................ 338/68 |
| 6,667,734 B1 | * | 12/2003 | Furukawa et al. .......... 345/161 |
| 2004/0069601 A1 | | 4/2004 | Gotoh |

FOREIGN PATENT DOCUMENTS

| | | |
|---|---|---|
| JP | 2867797 | 12/1998 |
| JP | 2002-170461 | 6/2002 |

\* cited by examiner

*Primary Examiner*—K. Richard Lee
(74) *Attorney, Agent, or Firm*—Brinks Hofer Gilson & Lione (57) ABSTRACT

A multi-directional switch contains a bearing 4, an operating shaft 3 supported rockably by the bearing 4, and a cam 15c for giving a required feeling of operation to a rocking operation of the operating shaft 3. In the cam 15c, a spherical surface-shaped bottom portion 41 for holding the operating shaft 3 in a non-operation position, first inclined surfaces 42, 43, 44 and 45 formed in a radial shape at an outer circumference of the bottom portion 41, and second inclined surfaces 46, 47, 48 and 49 formed in a radial shape at an outer circumference of the first inclined surfaces, are formed, and at the boundaries between the first inclined surfaces and the second inclined surfaces, swelled step portions 50, 51, 52 and 53 are formed, respectively.

2 Claims, 8 Drawing Sheets

MULTI-DIRECTIONAL SWITCH

This application claims the benefit of priority to Japanese Patent Application No. 2003-201788 filed on Jul. 25, 2003, herein incorporated by reference.

BACKGROUND OF THE INVENTION

1. Field of the Invention

The present invention relates to a multi-directional switch used in a vehicle power mirror device, and more specifically, means for giving a required feeling of operation to an operation of an operating shaft.

2. Description of the Related Art

As means for giving a feeling of operation such as a click to an operating portion of a multi-directional switch, means which allows a movable contact of a dome shape, formed of a metal plate, to be elastically deformed in an operating portion and transfers to the operating portion a feeling when the movable contact is elastically deformed (See Japanese Unexamined Patent Application Publication No. 2002-170461 (FIGS. 1 and 2)), means which allows a movable contact provided in a central protruding portion of a rubber seat, instead of the above-mentioned movable contact, to be elastically deformed in the operating portion and transfers to the operating portion a feeling when the central protruding portion is elastically deformed, and the like, are conventionally known.

Among the above-mentioned means, for the means which allows the movable contact of the dome shape, formed of the metal plate, to be elastically deformed in the operating portion and which allows a movable contact of a seesaw shape to abut to the operating portion, a required number of the movable contacts must be set to one per a predetermined setting point. As a result, there are problems in that many processes are required in assembling a switch and a high-priced switch is produced.

On the other hand, for the means which allows the central protruding portion formed in the rubber seat to be elastically deformed in the operating portion, only by assembling the rubber seat, in which a required number of the central protruding portions are integrally formed in a predetermined arrangement, in a predetermined position, a setting of all of feeling giving means (the central protruding portions) can be completed in one operation. As a result, it is possible to efficiently assemble the switch and to provide a low-priced switch product.

However, since the rubber seat is fabricated by a molding using a relatively large metal mold, in the case of adjusting the feeling of the click, the metal mold cannot be repaired for the plurality of the central protruding portions, and repairing the metal mold is costly. As a result, it is impossible to sufficiently lower the fabrication cost of the switch.

SUMMARY OF THE INVENTION

Accordingly, the present invention is designed to solve the above-mentioned problems, it is an object of the present invention to provide a low-priced multi-directional switch that is capable of giving a good feeling of operation to an operating portion.

To solve the above problems, in the present invention, there is provided a multi-directional switch that comprises a bearing, an operating shaft supported rockably by the bearing, and a cam for giving a required feeling of operation to an operation of the operating shaft, wherein an actuator reciprocating along the axis of the operating shaft and an elastic member for accelerating the actuator usually in one direction are provided in a tip portion of the operating shaft, wherein, in the cam, a spherical surface-shaped bottom portion for holding the operating shaft in a non-operation position via the actuator, a plurality of first inclined surfaces formed in a radial shape at an outer circumference of the bottom portion, and a plurality of second inclined surfaces formed in a radial shape at an outer circumference of the first inclined surfaces and having an inclined angle less than those of the first inclined surfaces are formed, and wherein swelled step portions are formed at the boundaries between the first inclined surfaces and the second inclined surfaces.

With such a structure, when the operating shaft rocks in one direction from a state in which the actuator abuts to the bottom portion of the cam, the actuator abutted to the bottom portion of the cam is moved to an upper side along a predetermined first inclined surface which corresponds to the rocking direction of the operating shaft, and then reaches the second inclined surface after exceeding the swelled step portion. As a result, in a step that the actuator exceeds the swelled step portion, a feeling of click can be given to the operating shaft. And then, only by assembling one cam in a predetermined position, a setting of all of feeling giving means (the swelled step portions) can be completed in one operation. Therefore, the assembling of the multi-directional switch is efficiently performed, and the cost of assembling the multi-directional switch can be reduced. Further, with a molding of this type of the cam, the metal mold can be easily repaired when the feeling of the click is adjusted, and it is possible to provide a low-priced metal mold. In addition, a repairing portion is constructed in a telescopic manner, it is possible to restore a shape of the metal mold in an original shape. Accordingly, it is possible to provide a low-priced multi-directional switch product compared to a conventional art.

Further, in the multi-directional switch of the present invention, the operating shaft is configured to be supported rockably and rotatably by the bearing. In the present invention, a feeling of click during a rocking of the multi-directional switch is implemented by a combination of the above-mentioned cam and actuator. Similarly, by forming a contact portion of the actuator in a spherical shape, the rotation of the operating shaft also becomes possible.

As described above, when the operating shaft is supported rockably and rotatably by the bearing, a switching of the contact can be performed by a rotation operation as well as the rocking operation of the operating shaft. As a result, it is possible to implement a multi-directional switch with a multifunction.

DETAILED DESCRIPTION OF THE EMBODIMENTS

Hereinafter, an application of a multi-directional switch according to an embodiment of the present invention to a power mirror device that adjusts an angle of vision of a motor-driven side mirror for a vehicle will be described with reference to FIGS. 1 to 9.

Figure 1:
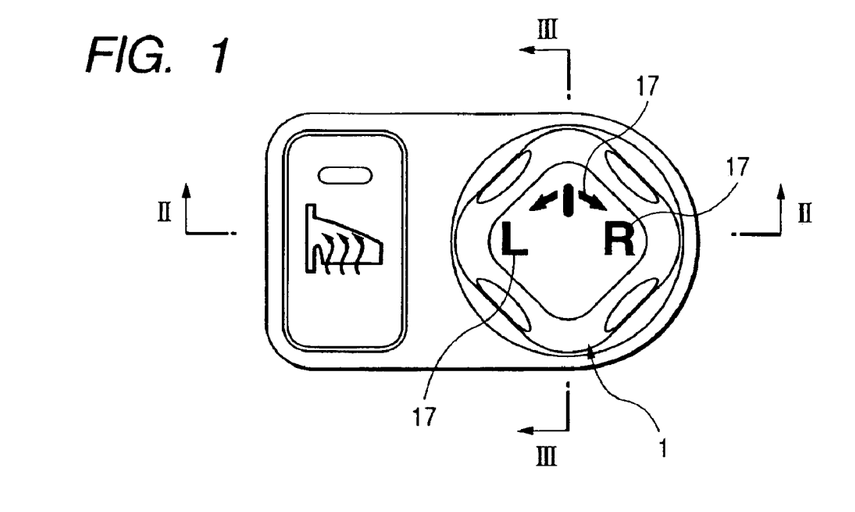
FIG. 1 is a plan view of a multi-directional switch according to an embodiment.
Figure 2:
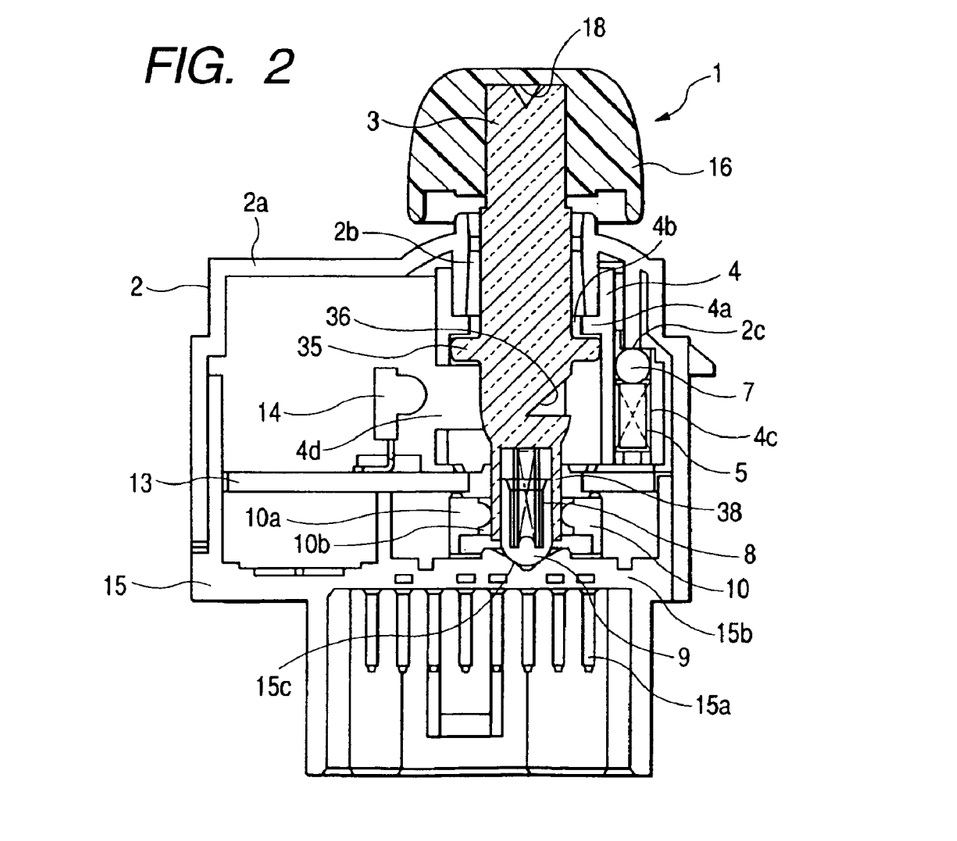
FIG. 2 is a cross-sectional view taken along the line II—II of FIG. 1.
Figure 3:
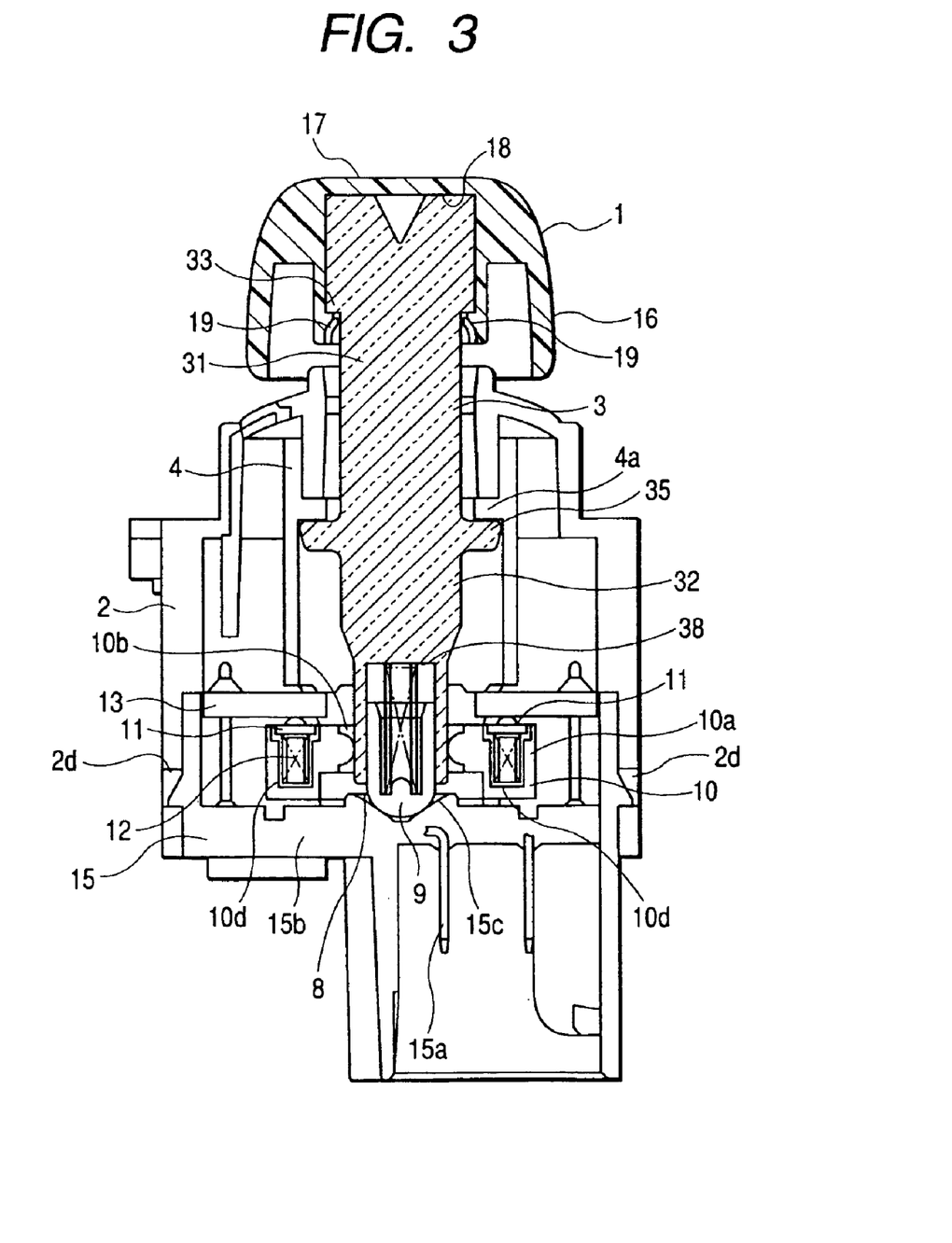
FIG. 3 is a cross-sectional view taken along the line III—III of FIG. 1.
Figure 4:
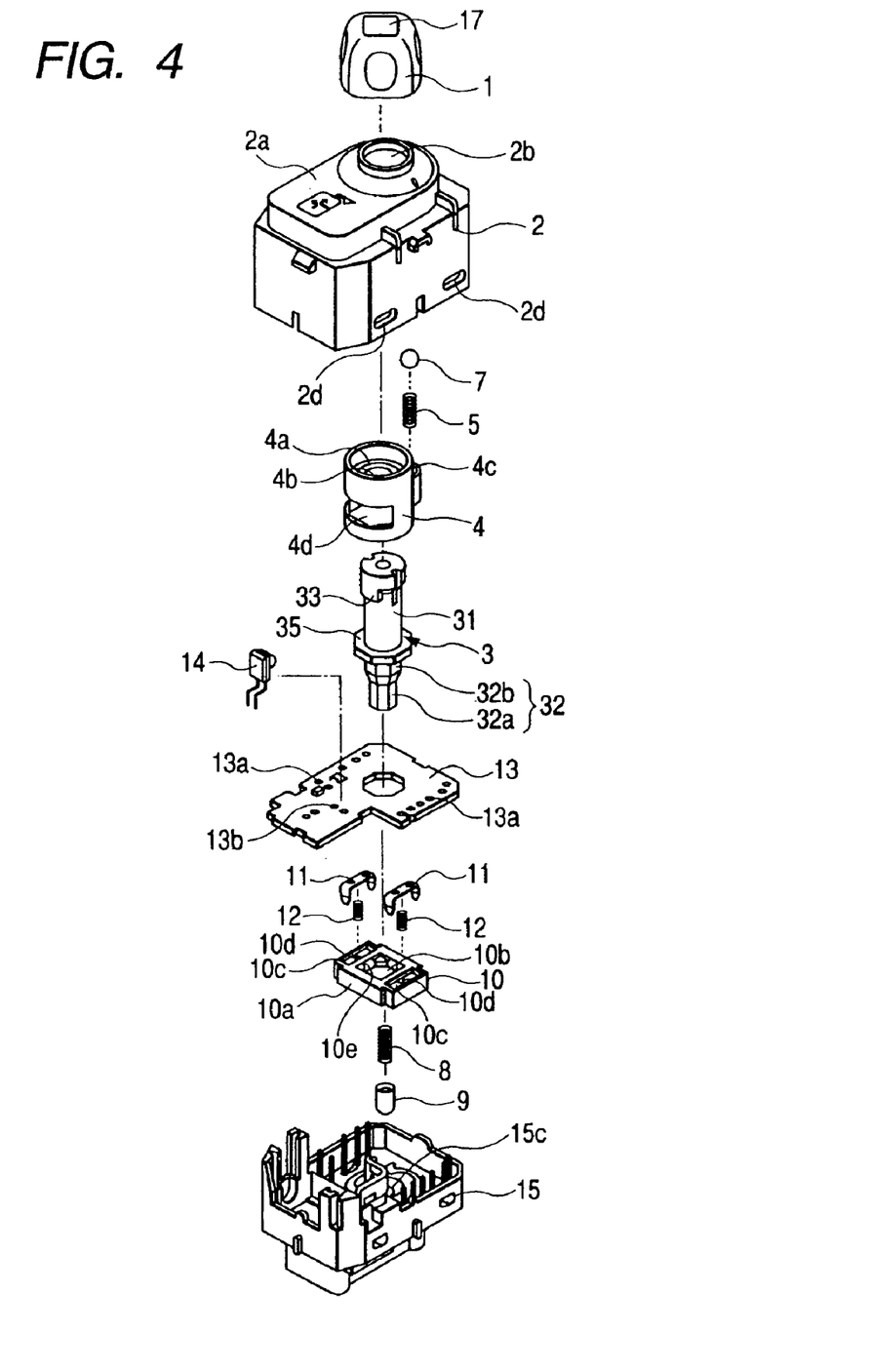
FIG. 4 is an exploded perspective view of the multi-directional switch according to the embodiment.
Figure 5A:
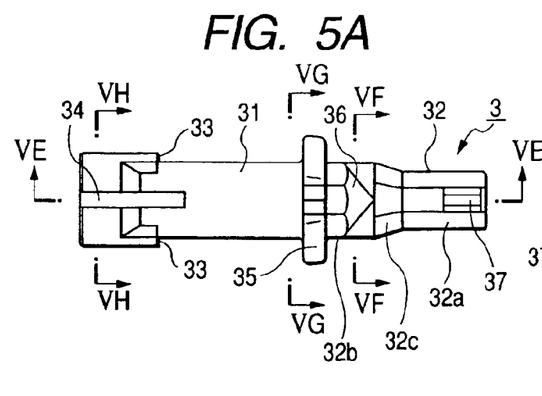
FIGS. 5A, 5B, 5C, 5D, 5E, 5F, 5G and 5H are explanation views showing a structure of each portion of an operating shaft included in the multi-directional switch according to the embodiment.
Figure 5B:
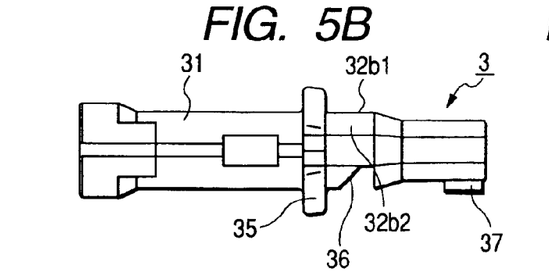
Figure 5C:
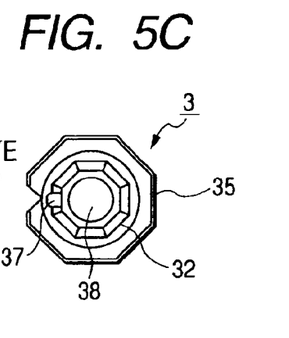
Figure 5D:
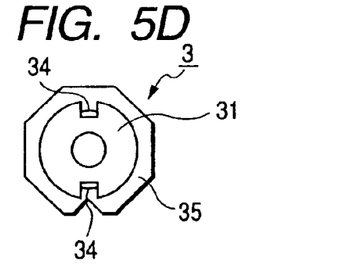
Figure 5E:
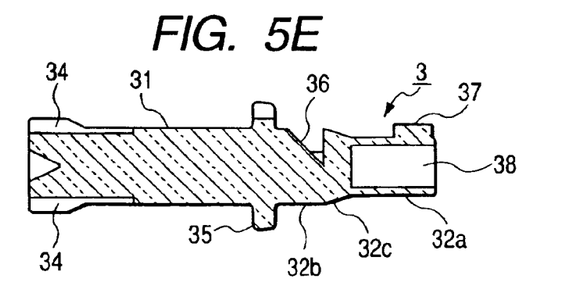
Figure 5F:
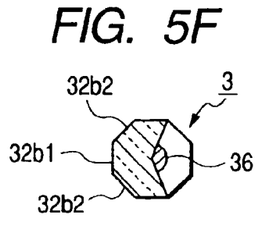
Figure 5G:
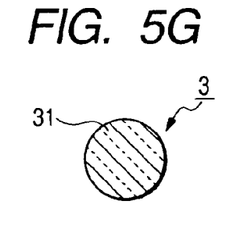
Figure 5H:
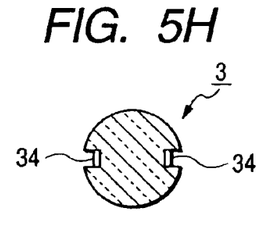
Figure 6A:
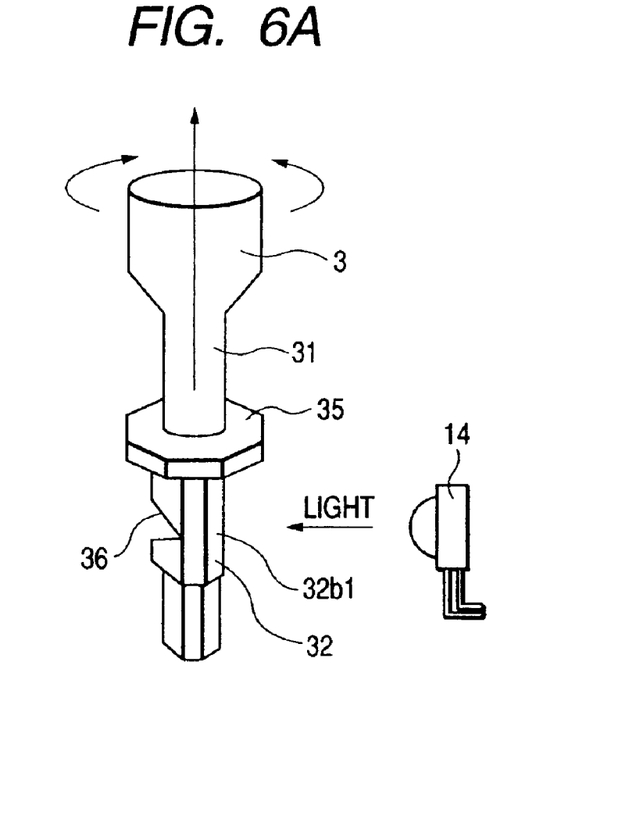
FIGS. 6A and 6B are explanation views showing a function of the operating shaft included in the multi-directional switch according to the embodiment.
Figure 6B:
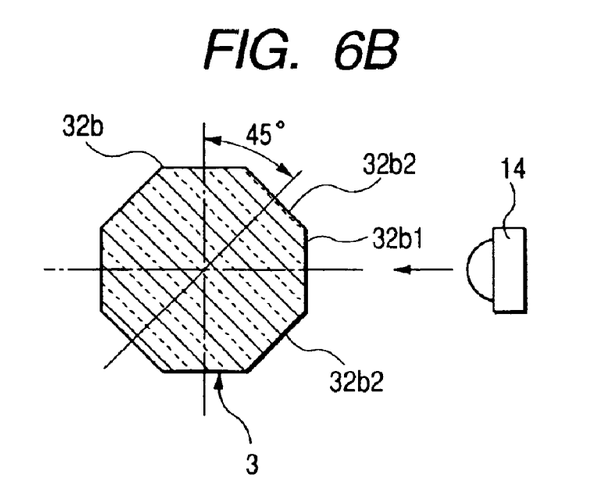
Figure 7:
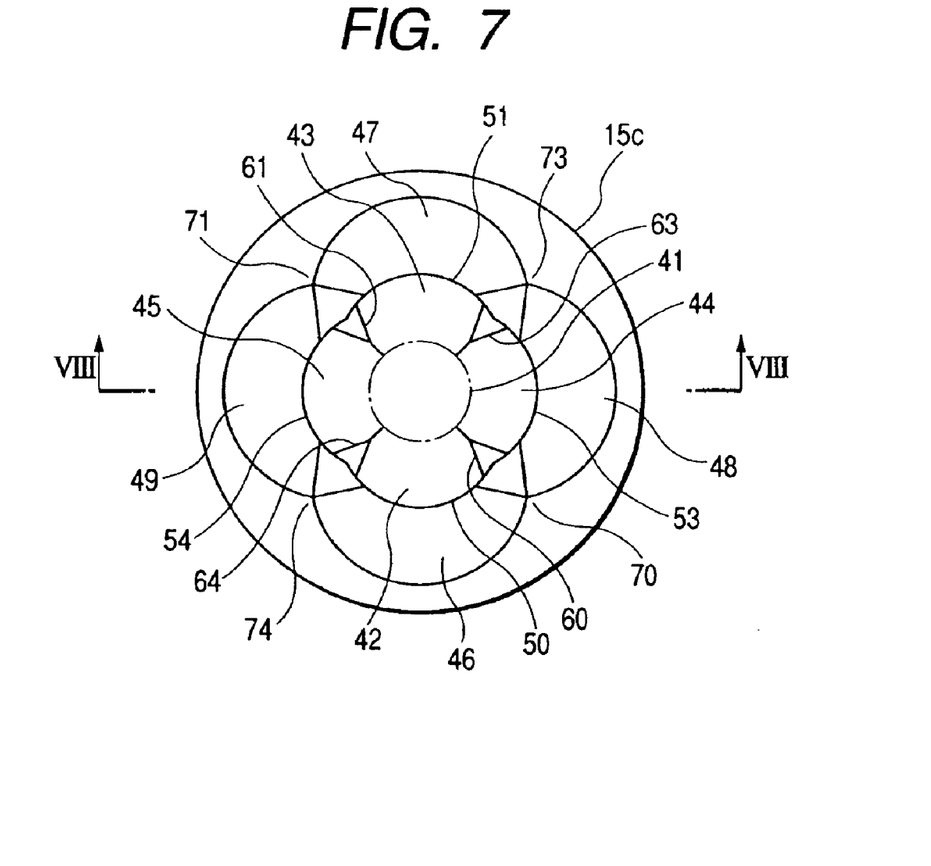
FIG. 7 is a plan view of a cam included in the multi-directional switch according to the embodiment.
Figure 8:
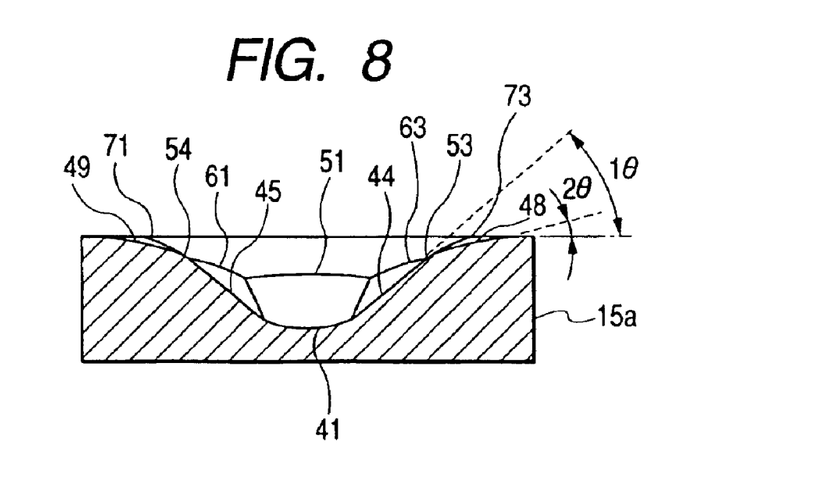
FIG. 8 is a cross-sectional view taken along the line VIII—VIII of FIG. 7.
Figure 9A:
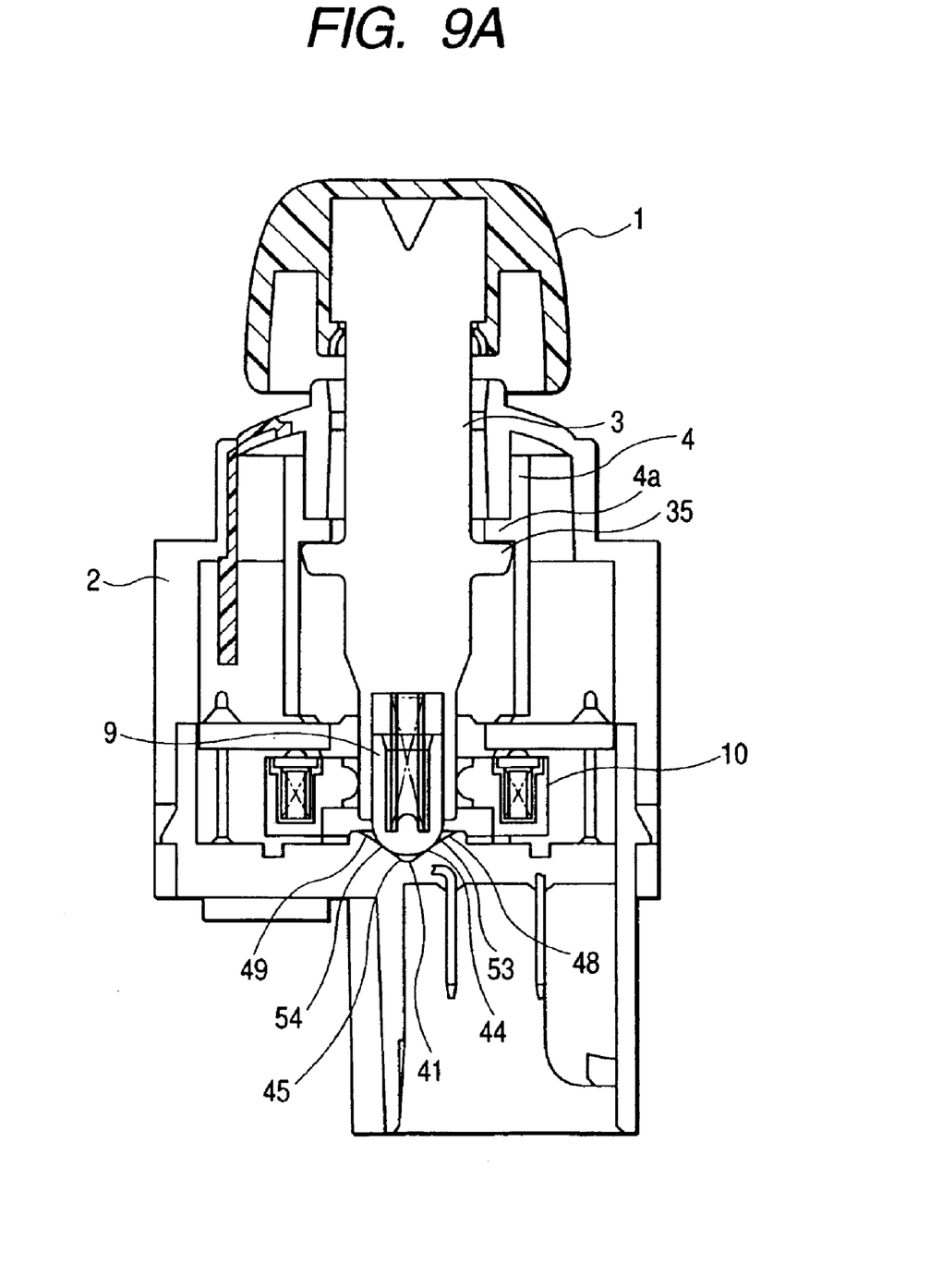
FIGS. 9A and 9B are explanation views showing an operation of the multi-directional switch according to the embodiment.
Figure 9B:
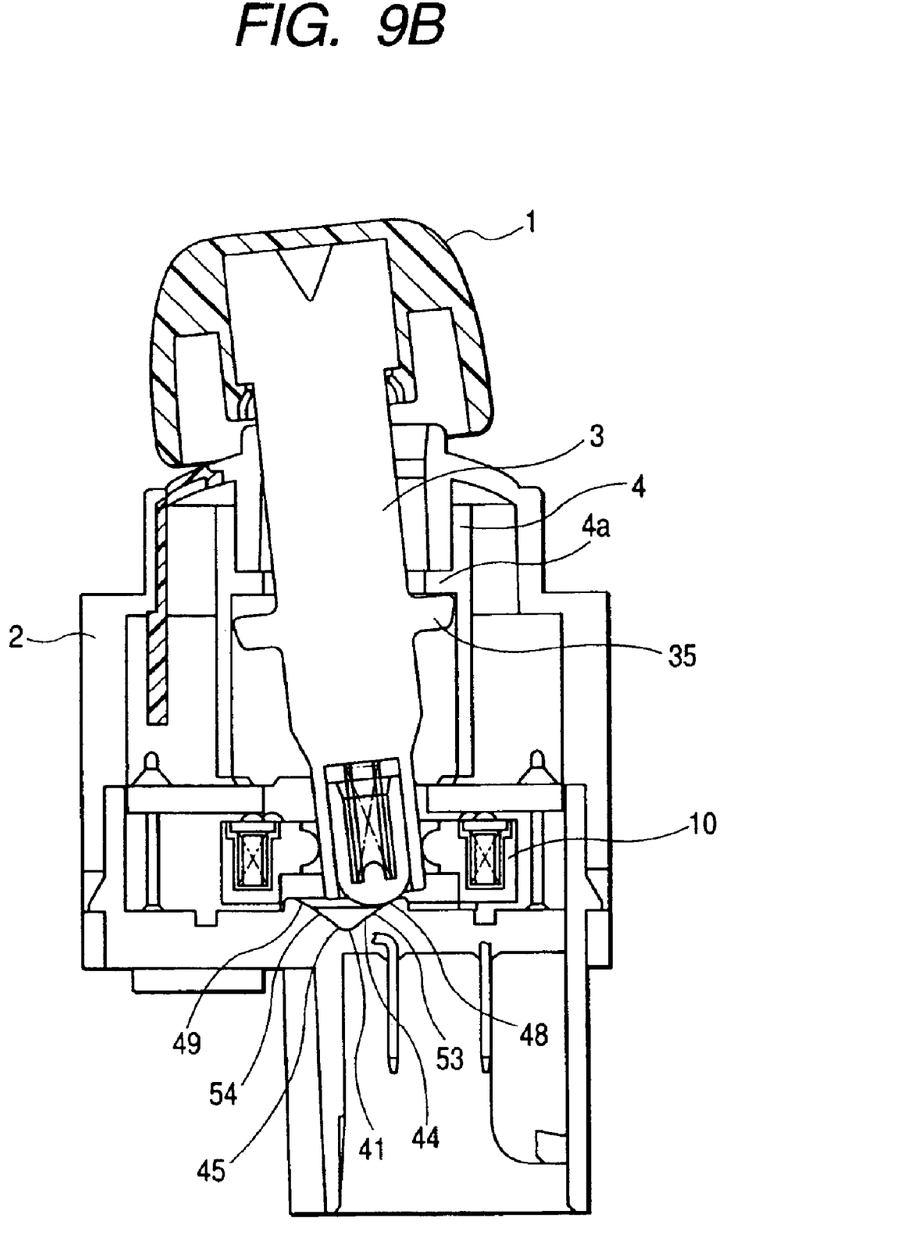

FIG. 1 is a plan view of a multi-directional switch according to an embodiment, FIG. 2 is a cross-sectional view taken along the line II—II of FIG. 1, FIG. 3 is a cross-sectional view taken along the line III—III of FIG. 1, FIG. 4 is an exploded perspective view of the multi-directional switch according to the embodiment, FIG. 5 is an explanation view showing a structure of each portion of an operating shaft included in the multi-directional switch according to the embodiment, FIG. 6 is an explanation view showing a function of the operating shaft included in the multi-directional switch according to the embodiment, FIG. 7 is a plan view of a cam included in the multi-directional switch according to the embodiment, FIG. 8 is a cross-sectional view taken along the line VIII—VIII of FIG. 7, and FIG. 9 is an explanation view showing an operation of the multi-directional switch according to the embodiment. Further, FIG. 5A is a front view, FIG. 5B is a plan view, FIG. 5C is a right side view, FIG. 5D is a left side view, FIG. 5E is a cross-sectional view taken along the line VE—VE, FIG. 5F is a cross-sectional view taken along the line VF—VF, FIG. 5G is a cross-sectional view taken along the line VG—VG, and FIG. 5H is a cross-sectional view taken along the line VH—VH.

As is apparent from FIG. 1, a multi-directional switch according to the present embodiment comprises a knob 1, a case 2, an operating shaft 3, a bearing 4 for holding the operating shaft 3 while allowing it to rock and rotate, a coil spring 5 whose one end is held in the bearing 4, a ball 7 pressed by the coil spring 5 into detent portions 2c, which are formed on an inner surface of the case 2, a coil spring 8 and an actuator 9 mounted on a lower end of the operating shaft 3, a slider 10 driven by a rotating or rocking operation of the operating shaft 3, two movable contacts 11 and coil springs 12 attached to the slider 10, a wiring board 13 provided with a required electric circuit that includes fixed contacts for switching left and right side mirrors and a fixed contact for adjusting an angle of vision, a light-emitting element 14 connected to the wiring board 13, and a wafer 15 provided with a plurality of leads 15a that is electrically connected to the wiring board 13, a holding portion 15b for holding the slider 10 and a cam 15c for giving a required feeling of operation to an operation of the operating shaft 3.

The knob 1 has a rectangular cylinder-shaped gripping portion 16, on an upper surface of which light-transmitting pictographs 17 for indicating operation directions of the multi-directional switch and functions in accordance with the operation directions are formed, as shown in FIGS. 1 to 4. Both of these portions are made of insulating resin material. A fitting hole 1B, into which the operating shaft 3 is fitted, is formed in the inside of the gripping portion 16, and a locking pawl 19 for engaging the operating shaft 3 is formed downward on an inner circumferential portion of the fitting hole 18.

The case 2 houses each member to be described below, and is formed in a box shape having an opened lower surface using insulating resin material. On an upper surface portion 2a of the case 2, a through hole 2b through which the operating shaft 3 rocks is formed, as shown in FIGS. 2 and 3. Further, on an inner surface of the upper surface portion 2a, a plurality (in the present embodiment, three of a neutral position, a right position being rotated by 45 degrees in a right direction from the neutral position and a left position being rotated by 45 degrees in a left direction from the neutral position) of detent portions 2c, in which the ball 7 included in the bearing 4 is engaged, for giving a feeling of click to a rotation operation of the knob 1 are formed, as shown in FIG. 2. In addition, in a lower end portion of the case 2, a plurality of locking holes 2d for integrally engaging the wafer 15 is formed, as shown in FIGS. 3 and 4.

The operating shaft 3 transfers a force applied to the knob 1 to each member housed in the case 2, and selectively switches a required switch contact in accordance with an operation direction of the knob 1. Further, the entire operating shaft 3 is made of a light-transmitting material and serves as a light guide for guiding light emitted from the light-emitting element 14 to the pictographs 17 formed in the knob 1. The operating shaft 3 comprises a columnar portion 31 and an angled pillar portion 32, and near the upper end portion of the columnar portion 31, a locking step portion 33 which engages the locking pawl 19 formed in the knob 1 and prevents the knob 1 from being detached, and recess portions 34 into which protrusions (not shown) formed in the fitting hole 18 of the knob 1 are fitted and which prevents the knob 1 from being rotated are formed, as shown in FIGS. 3 to 5H. That is, the protrusions (not shown) of the fitting hole 18 of the knob 1 are fitted into the recess portions 34 and the tip of the locking pawl 19 engages the locking step portion 33, so that the knob 1 is integrated with the operating shaft 3. And then, between the columnar portion 31 and the angled pillar portion 32, a polygonal plane-shaped flange member 35 (an octagon in the present embodiment) is integrally formed.

On the other hand, the angled pillar portion 32 comprises a small diameter angled pillar portion 32a formed near a lower end portion, a large diameter angled pillar portion 32b formed near an upper end portion, and a square pyramid portion 32c formed between them, as shown in FIG. 5A.

In a part of the large diameter angled pillar portion 32b, a conical reflective surface 36 which is inclined at an angle of 45 degrees with respect to a shaft center of the operating shaft 3 (it aligns with the shaft center of the large diameter angled pillar portion 32b) and whose inner end lines up with a lower end of the large diameter angled pillar portion 32b on the shaft center of the operating shaft 3 is notched. Each side surface 32b1 of the large diameter angled pillar portion 32b opposite to the reflective surface 36 is an incident surface of light emitted from the light-emitting element 14, and the light incident on the incident surfaces is reflected upward to the reflective surface 36 to illuminate the pictographs 17 of the knob 1.

In an outer surface of the lower end portion of the small diameter angled pillar portion 32a, a protruding branch 37 to which the slider 10 is engaged is formed, as shown in FIG. 5B. The protruding branch 37 is inserted into the slider 10 together with a tip portion of the small diameter angled pillar portion 32a, and so a sliding motion of the slider 10 according to the rocking operation of the operating shaft 3 and a rotation motion of the slider 10 according to the rotation operation of the operating shaft 3 become possible. Further, a housing hole 38 is formed in a lower end surface of the small diameter angled pillar portion 32a, and the coil spring 8 and the actuator 9 are housed in the housing hole 38, the actuator 9 being accelerated usually in a direction along the axis of the operating shaft 3 by the coil spring 8. A tip portion of the actuator 9 abuts to the cam 15c provided in the bottom surface of the wafer 15 by a spring force of the coil spring 8, and a reaction force thereof can be absorbed by a receiving portion 4a of the bearing 4 on which the flange portion 35 of the operating shaft 3 abuts.

The bearing 4 receives the flange portion 35 of the operating shaft 3 to hold the operating shaft 3 so that it may rock and rotates integrally with the operating shaft 3 to drive the rotation of the slider 10. The bearing 4 is formed in a cylindrical shape with the receiving portion 4a using an insulating resin material. In the receiving portion 4a, a through hole 4b through which the operating shaft 3 passes rockably is formed. Further, an inner surface of the bearing 4 is formed in a polygonal plane shape (an octagon in the present embodiment) into which the flange portion 35 may be inserted. Accordingly, the operating shaft 3 can rock independently within the bearing 4, and when the operating shaft 3 rotates around the shaft axis, the bearing 4 rotates integrally with the flange portion 35. Further, on an outer surface of the bearing 4, a housing hole 4c for housing the ball 7 and the coil spring 5 for detent is formed, as shown in FIGS. 3 and 4. Further, on an outer surface facing the light-emitting element 14 described below, a through hole 4d is formed.

The slider 10 slides in the rocking direction of the operating shaft 3 or rotates around the axis of the operating shaft 3, in connection with the rocking operation or rotation operation of the operating shaft 3. The slider 10 is formed in a rectangular plane-shaped plate shape using an insulating resin material. The slider 10 has a board portion 10a, and in a central part of the board portion 10a, a through hole 10b through which the small diameter angled pillar portion 32a of the operating shaft 3 passes is formed, as shown in FIGS. 2 to 4. Further, in both of longitudinal ends of the surface of the board portion 10a, two movable contact mounting holes 10c for mounting the movable contacts 11 and two spring mounting holes 10d for mounting the coil springs 12 are formed. The spring mounting holes 10d are formed in a central part of a pair of the movable contact mounting holes 10c. Further, in an inner surface of the through hole 10b, a concave recess 10e to which the protruding branch 37 of the operating shaft 3 is engaged is formed.

The movable contacts 11 are formed in a U shape using conductive material having an excellent elasticity and conductivity such as phosphor bronze.

The coil springs 12 press the movable contacts 11 usually against a rear surface of the wiring board 13 and is housed in the spring mounting holes 10d formed in the slider 10, wherein the upper ends of the coil springs 12 abut to rear surfaces of the movable contacts 11.

On a surface side of the wiring board 13, fixed contacts (not shown) for switching the left and right side mirrors to be switched by the movable contacts 11 and fixed contacts (not shown) for adjusting an inclination are formed. Further, in the wiring board 13, as shown in FIG. 4, a plurality of through holes 13a into which the leads included in the wafer 15 are inserted and which is electrically connected to a conductive pattern formed in the wiring board 13, and through holes 13b for electrically connecting the light-emitting element 14 are formed.

As the light-emitting element 14, it is desirable for a light emitting diode to have a compact size and a long life. As shown in FIGS. 2 and 6A, the light-emitting element 14 is arranged to face the side surface (the incident surface) 32b1 of an opposing side of the reflective surface 36 formed in the large diameter angled pillar portion 32b of the operating shaft 3.

The wafer 15 holds various built-in components and serves as a connecter for introducing a switch signal generated by operating the knob 1 to an exterior. The wafer 15 is made of an insulating resin material. As shown in FIGS. 7 and 8, the cam 15c provided in a bottom surface of the wafer 15 comprises a spherical surface-shaped bottom portion 41 for holding the operating shaft 3 in a non-operation position via the actuator 9, a plurality of first inclined surfaces 42, 43, 44 and 45 (four in the present embodiment) formed in a radial shape at an outer circumference of the bottom portion 41, and a plurality of second inclined surfaces 46, 47, 48 and 49 formed in a radial shape at an outer circumference of the first inclined surfaces 42, 43, 44 and 45. And then, an inclination angle θ2 of the second inclined surfaces 46, 47, 48 and 49 is made to be less than an inclination angle θ1 of the first inclined surfaces 42, 43, 44 and 45, so that at the boundary between the first inclined surface 42 and the second inclined surface 46, a boundary part between the first inclined surface 43 and the second inclined surface 47, a boundary part between the first inclined surface 44 and the second inclined surface 48, and a boundary part between the first inclined surface 45 and the second inclined surface 49, swelled step portions 50, 51 52 and 53 are formed.

At the boundaries between the first inclined surfaces 42, 43, 44 and 45, protrusions 60, 61, 63, and 64 are formed, respectively, whereby the first inclined surfaces 42, 43, 44 and 45 become a concave portion in a circumferential direction. The tip portion of the actuator 9 is guided along the concave portion, so that an undesirable movement to a middle direction is restricted. Further, at the boundaries between the second inclined surfaces 46, 47, 48 and 49, protrusions 70, 71, 73 and 74 are formed, respectively, whereby the second inclined surfaces 46, 47, 48 and 49 become a concave portion in a circumferential direction. The tip portion of the actuator 9 is guided along the concave portion, so that an undesirable movement to a middle region is restricted.

Hereinafter, a motion of a multi-directional switch according to the present embodiment with such a structure will be described.

When the knob 1 is in a non-operation state as shown in FIG. 9A, the tip portion of the actuator 9 elastically abuts to the bottom portion 41 of the cam 15c, and the operating shaft 3 is held in a vertical state. At this time, any of the switches for adjusting the angle of vision of the left and right side mirrors is switched to a neutral position, so that the adjustment of the angle of vision of the mirror is not performed. Further, when the knob 1 is in the central position of a rotation direction, the switches of the left and right side mirrors are also switched in a neutral position, so that the switching operations of the left and right side mirrors are not performed.

When the knob 1 is operated to be rotated by 45 degrees in the "L" direction shown in FIG. 1 from the above state, a rotation force is transferred to the slider 10 via the operating shaft 3, so that the movable contacts 11 included in the slider 10 are moved to the setting positions of the fixed contacts of the switch for adjusting the angle of vision of the left side mirror. In this state, the adjustment of the angle of vision of the left side mirror can be performed. Further, when the knob 1 is operated to be rotated by 45 degrees in the "R" direction shown in FIG. 1 from the central position of the rotation direction, a rotation force is transferred to the slider 10 via the operating shaft 3, so that the movable contacts 11 included in the slider 10 are moved to the setting positions of the fixed contacts of the switch for adjusting the angle of vision of the right side mirror. In this state, the adjustment of the angle of vision of the right side mirror can be performed. Moreover, during the rotation operation of the knob 1, the bearing 4 is rotated along with the operating shaft 3, and the ball 7 is accelerated by the coil spring 5 to move between the detent portions 2c formed in the case 2. As a result, the user can sense a feeling of click generated at that time and can perform with certainty the switching operations of the left and right side mirrors based on a good sense of use. In addition, when the hands of the user are separated from the knob 1, the knob 1 is positioned in that state.

As described above, at a state in which the knob 1 has been rotated by 45 degrees in the left direction or right direction from the central position of the rotation direction, when the knob 1 is operated to rock upward, the tip portion of the actuator 9 goes up along the first inclined surface 42 from the bottom portion 41 of the cam 15c, and exceeds the swelled step portion 50 to reach the second inclined surface 46 as shown in FIG. 9B. And then, when the tip portion of the actuator 9 reaches an operation end portion on the second inclined surface 46, the movable contacts 11 of the slider 10 which slidably moves in accordance with the rocking operation of the operating shaft 3 are moved to the setting positions of the fixed contacts of the switch for adjusting the angle of vision, whereby the angle of vision of the mirror is adjusted upward. Moreover, when the tip portion of the actuator 9 exceeds the swelled step portion 50, a feeling of click is transferred to knob 1 via the actuator 9 and the operating shaft 3, so that the user can perform the adjustment of the angle of vision of the left and right side mirrors based on a good sense of use. In this state, when the user releases his hand from the knob 1, the actuator 9 goes down the second inclined surface 46, the swelled step portion 50 and the first inclined surface 42 by an elastic force of the coil spring 8 and returns automatically to the bottom portion 41 of the cam 15c.

Similarly, when the knob 1 is operated to rock downward, the tip portion of the actuator 9 goes up along the first surface 43 from the bottom portion 41 of the cam 15c and exceeds the swelled step portion 51 to reach the second inclined surface 47, whereby the angle of vision of the mirror is adjusted downward. Further, when the knob 1 is operated to rock leftward, the tip portion of the actuator 9 goes up along the first inclined surface 44 from the bottom portion 41 of the cam 15c, and exceeds the swelled step portion 52 to reach the second inclined surface 48, whereby the angle of vision of the mirror is adjusted leftward. Further, when the knob 1 is operated to rock rightward, the tip portion of the actuator 9 goes up along the first inclined surface 45 from the bottom portion 41 of the cam 15c, and exceeds the swelled step portion 53 to reach the second inclined surface 49, whereby the angle of vision of the mirror is adjusted rightward.

Next, a method for illuminating the pictographs 17 shown in the knob 1 will be described. As shown in FIGS. 6A and 6B, light emitted from the light-emitting element 14 is incident from the side surface 32b1 of the large diameter angled pillar portion 32b formed in the operating shaft 3. The side surface 32b1 allows the light from the light-emitting element 14 to be incident efficiently because it is arranged perpendicularly with respect to the light path. The incident light is reflected upward by the inverse cone-shaped reflective surface 36 and illuminates entirely the pictographs 17 of the knob 1 with a sufficient intensity of illumination. And then, for example, when the knob 1 is rotated by 45 degrees in a right direction, the operating shaft 3 is rotated by 45 degrees, and the next side surface 32b2 of the octagonal pillar-shaped large diameter angled pillar portion 32 of the operation shaft 3 is arranged perpendicularly with respect to the light path again. Accordingly, even though the operating shaft 3 is rotated, the light from the light-emitting element 14 is efficiently incident to thereby illuminate the pictographs 17 of the knob 1 with a sufficient intensity of illumination. In addition, even when the operating shaft 3 rocks, the light incident onto the operating shaft 3 is reflected in an outer peripheral surface of the columnar portion 31 of the operating shaft 3 to illuminate the pictographs 17 of the knob 1 with a sufficient intensity of illumination.

Moreover, the light-emitting element 14 may be lighted regardless of the switching operation of the switch, and it may be lighted only when a specific switch is turned on.

The multi-directional switch of the present embodiment can give a required feeling of operation to an operation of the operating shaft which rocks in multiple-directions, only by including one cam 15c having the bottom portion 41, the first inclined surfaces 42, 43, 44 and 45, the second inclined surfaces 46, 47, 48 and 49, and the swelled step portions 50, 51, 52 and 53 as required. As a result, it is possible to assemble the multi-directional switch efficiently, and it is possible to reduce the cost required to assemble the multi-directional switch. Further, since the molding of the cam 15c is performed using a 1 to 4-cavity metal mold, it is possible to easily repair the metal mold when adjusting the feeling of click, and it is possible to reduce the cost of the metal mold. In addition, when a modified portion is constructed in a telescopic manner, it is possible to restore a shape of the metal mold to an original shape. Accordingly, it is possible to provide a low-priced multi-directional switch product compared to the conventional art.

Further, in the multi-directional switch of the present embodiment, since the operating shaft 3 is made of a light-transmitting material, and in the operating shaft 3, there is provided a light guide path for guiding light to be incident from an exterior in an end surface direction, it is possible to guide the light guided to the end surface of the operating shaft 3 via the light guide path to the knob 1 attached to one end of the operating shaft 3. Accordingly, in the multi-directional switch of the present embodiment, it is possible to illuminate the pictographs 17 shown in the knob 1. As a result, the multi-directional switch may be suitable for an illuminated electric device.

In addition, in the multi-directional switch of the present embodiment, since the operating shaft 3 is rockably and rotatably supported by the bearing 4, it is possible to operate a switching of a contact through the rotation operation of the operating shaft 3 as well as the rocking operation of the operating shaft 3, whereby it is possible to provide a multi-directional switch which is more multifunctional.

Moreover, in the embodiment, an application of the multi-directional switch of the present invention to a power mirror device for a vehicle is described, but the spirit and scope of the present invention is not limited to the above-mentioned application, and it is also possible to apply the present invention to various applications.

Further, in the embodiment, as an elastic member, there are provided the coil springs 5, 8 and 12, but the spirit and scope of the present invention is not limited thereto, and it is possible to use other elastic members well known in the art.

Further, in the embodiment, the cam 15c is molded integrally with the wafer 15, but the spirit and scope of the present invention is not limited to such a structure, and it is possible to mold separately the cam 15c and the wafer 15 and attach the cam 15c to a predetermined position of the wafer 15 later.

As described above, according to the present invention, only by including one cam having the bottom portion, the first inclined surfaces, the second inclined surfaces and the swelled step portions as required, it is possible to give the required feeling of operation to the operation of the operating shaft which is able to rock in multiple-directions. As a result, it is possible to perform efficiently the assembling of the multi-directional switch and reduce the cost to assemble the multi-directional switch. Further, since the molding of the cam is performed using a 1 to 4-cavity metal mold, it is possible to easily repair the metal mold when adjusting the feeling of click and reduce the cost of the metal mold. Furthermore, when the repairing portion is made in the telescopic manner, it is possible to restore easily the shape of the metal mold to an original shape. Accordingly, it is possible to provide a low-priced multi-directional switch product compared to the conventional art.

What is claimed is:

1. A multi-directional switch, comprising:

a bearing;

an operating shaft rockably supported by the bearing; and a cam for giving a required feeling of operation to an operation of the operating shaft, wherein an actuator reciprocating along an axis of the operating shaft and an elastic member accelerating the actuator in one direction are provided in a tip portion of the operating shaft, wherein, in the cam, a spherical surface-shaped bottom portion for holding the operating shaft in a non-operation position via the actuator, a plurality of first inclined surfaces formed in a radial shape at an outer circumference of the bottom portion, and a plurality of second inclined surfaces formed in a radial shape at an outer circumference of the first inclined surfaces and having an inclined angle less than those of the first inclined surfaces, are formed, and wherein swelled step portions are provided at boundaries between the first inclined surfaces and the second inclined surfaces.

2. The multi-directional switch according to claim 1, wherein the operating shaft is rockably and rotatably supported by the bearing.

* * * * *